(12) United States Patent
Stolle et al.

(10) Patent No.: US 9,575,771 B2
(45) Date of Patent: Feb. 21, 2017

(54) METHOD FOR INTEGRATING A COMPONENT INTO AN INFORMATION SYSTEM OF A VEHICLE

(75) Inventors: Reinhard Stolle, Karlsfeld (DE); Andreas Hildisch, Munich (DE); Juergen Steurer, Munich (DE); Ralf Decke, Unterhaching (DE); Christoph Ainhauser, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 525 days.

(21) Appl. No.: 13/440,557

(22) Filed: Apr. 5, 2012

(65) Prior Publication Data

US 2012/0192109 A1    Jul. 26, 2012

Related U.S. Application Data

(63) Continuation of application No. PCT/EP2010/064575, filed on Sep. 30, 2010.

(30) Foreign Application Priority Data

Oct. 8, 2009   (DE) .................. 10 2009 048 638
Dec. 19, 2009  (DE) .................. 10 2009 059 141

(51) Int. Cl.
  *G06F 9/44*    (2006.01)
  *G06F 3/048*   (2013.01)
  *G06F 17/30*   (2006.01)

(52) U.S. Cl.
  CPC .......... *G06F 9/4443* (2013.01); *G06F 17/30* (2013.01); *G06F 3/048* (2013.01); *G06F 9/44* (2013.01)

(58) Field of Classification Search
  CPC .......... G06F 17/30; G06F 3/048; G06F 9/44

USPC .................. 715/810, 764; 718/100
See application file for complete search history.

(56) References Cited

U.S. PATENT DOCUMENTS

| | | | |
|---|---|---|---|
| 7,058,898 B2 | 6/2006 | McWalter et al. | |
| 7,277,780 B2 | 10/2007 | Meier-Arendt et al. | |
| 7,643,415 B2 | 1/2010 | Vollmer et al. | |
| 2003/0028689 A1 | 2/2003 | Fasolt | |
| 2003/0179233 A1* | 9/2003 | McWalter et al. | 345/762 |
| 2004/0054445 A1 | 3/2004 | Vollmer et al. | |
| 2005/0231529 A1* | 10/2005 | Skwarek et al. | 345/619 |

(Continued)

FOREIGN PATENT DOCUMENTS

| | | |
|---|---|---|
| DE | 100 05 566 A1 | 8/2001 |
| DE | 100 22 423 A1 | 11/2001 |

(Continued)

OTHER PUBLICATIONS

International Preliminary Report on Patentability dated Apr. 11, 2012 (Ten (10) pages).

(Continued)

*Primary Examiner* — Andrea Leggett
(74) *Attorney, Agent, or Firm* — Crowell & Moring LLP

(57) ABSTRACT

A method of integrating a component into an information system of a vehicle is provided, in which at least one application executable or provided by the component is made available to a user of the vehicle by a man-machine interface of the information system. The integration of the component into the information system with respect to the input and/or output of information by the user is carried out in a personalized manner with respect to a user of the component.

24 Claims, 2 Drawing Sheets

(56) References Cited

U.S. PATENT DOCUMENTS

2009/0259364 A1    10/2009    Vollmer et al.

FOREIGN PATENT DOCUMENTS

| | | |
|---|---|---|
| DE | 100 63 390 A1 | 6/2002 |
| DE | 101 34 717 A1 | 2/2003 |
| DE | 101 51 007 A1 | 4/2003 |
| DE | 101 59 477 A1 | 7/2003 |
| DE | 101 62 653 A1 | 7/2003 |
| DE | 103 40 870 A1 | 4/2005 |
| DE | 10 2008 007 388 A1 | 8/2009 |
| DE | 10 2008 019 288 A1 | 10/2009 |
| EP | 1 347 377 A2 | 9/2003 |
| WO | WO 2005/055046 A1 | 6/2005 |
| WO | WO 2005/105509 A1 | 11/2005 |

OTHER PUBLICATIONS

Andreas Hildisch et al., "HMI generation for plug-in services from semantic descriptions", BMW Car IT GmbH. (Seven (7) pages).
German Search Report dated Oct. 14, 2010 including partial English-language translation. (Nine (9) pages).
International Search Report dated Dec. 7, 2010 including English-language translation. (Four (4) pages).

\* cited by examiner

METHOD FOR INTEGRATING A COMPONENT INTO AN INFORMATION SYSTEM OF A VEHICLE

CROSS-REFERENCE TO RELATED APPLICATIONS

This application is a continuation of PCT International Application No. PCT/EP2010/064575, filed Sep. 30, 2010, which claims priority under 35 U.S.C. §119 from German Patent Application Nos. DE 10 2009 048 638.0, filed Oct. 8, 2009, and DE 10 2009 05.9, filed Dec. 19, 2009, the entire disclosures of which are herein expressly incorporated by reference.

BACKGROUND AND SUMMARY OF THE INVENTION

The invention relates to a method of integrating a component into an information system of a vehicle, in which at least one application executable or provided by the component is made available to a user of the vehicle by a man-machine interface of the information system. The invention also relates to a computer program product as well as to an information system in a vehicle.

A retrofitting or a connection of components, as, for example, a telephone, an MP3 player, etc., in a vehicle is oftentimes difficult to implement because of a lack of technical preparation. Here, the problem arises concerning the operation of these temporarily or permanently retrofitted components. In particular, for reasons of ergonomics and driving safety, an operation of the retrofitted components by input and output devices present in the means of transport makes sense. As input devices, function keys, touch screens, mouse devices etc. are frequently available in a vehicle for the haptic operation, and microphones are available for the voice input. Graphic indications, such as displays, lights, etc. or voice output by way of microphones are used for the output.

For the operation in the vehicle, increasingly also so-called information systems with multifunction operating units are increasingly available, which offer a maximal amount of flexibility by use of graphic displays as output devices and the pertaining operating elements as input devices. Driving safety demands a strict schematization of the information system that can be operated by the driver without great diversion. This schematization is expressed by a defining of the input/output rules for these multifunction operating units. Thus, it may be stipulated in these rules that, for example, starting at a certain speed, no haptic operation should take place or that a display should indicate information only in a minimum letter size.

In the case of retrofitted components, it is difficult to provide a maximum of operability with a simultaneously strict schematization because neither the extent and type of the functionality or the interaction demands of the components to be operated can be predicted, nor are the information systems standardized relative to all vehicle equipment, all lines of production or covering all makes of all vehicles.

From German Patent document DE 101 34 717 A1, a method is known for configuring an information system in a means of transport. In the case of this method, the integration of retrofitted components as well as input/output devices takes place automatically and in a manner adapted to the input/output rules of the information system. Within the scope of this method, when connecting an additional component to the information system, a component input/output rule is transmitted by way of an interface to the information system. The component input/output rule is integrated by the information system into the input/output unit and the input/output processes such that the component can be controlled by way of the information system.

Input/output processes are all communications and interaction processes between the output devices, the input devices, the information system and/or the component. The set of input/output rules contains information concerning the version, the selection possibilities, the expansion possibilities, the type and manner of operation as well as the available input and output devices and the possible integration and interaction processes for the information system. In the component input/output rule, it is stipulated that a corresponding assignment is to be used for a type of component input/output rule already stored in the information system.

In this manner, it is taken into account in the known method which menu tree is already present, whether voice input or output is possible or whether a graphic display is present and function keys are available. By way of the input/output rules, further conditions can be defined in that it is indicated that the maximal number of displayable entries in a graphic display should not exceed a certain value. By use of the rules, it can, for example, also be indicated that, although function keys are available on the input device, only voice operation is permitted.

The method described in German Patent document DE 101 34 717 A1 permits the integration of a component into an information system of a vehicle in which the operation of the information system by the driver can take place without any great diversion by way of the input/output devices available in the vehicle. In this case, the operation takes place while taking into account safety-related aspects, so that, during the drive in the vehicle, certain functions of the component may not be available under certain circumstances, while the latter can be operated and used during the drive.

It is an object of the present invention to indicate a method of integrating a component into an information system of a vehicle, which permits an improved integration of the component into the function sequences of the information system. It is a further object of the present invention to indicate a corresponding computer program product as well as an information system in a vehicle, which permit the further improved integration of the component into the information system.

The invention provides a method of integrating a component into an information system of a vehicle, in which at least one application executable or provided by the component is made available to a user of the vehicle by a man-machine interface of the information system. In the case of this method, the integration of the component into the information system with respect to the input and/or output of information is carried out in a personalized manner in regard to a user of the component.

In the case of the method according to the invention, it is possible for a user to integrate the component with respect to the operation into the information system. The user can carry out the integration according to his wishes and needs, so that the component with the applications running on it can be used by him in the best possible manner. Because of the fact that the user integrates the component with the applications executable or provided thereon in a manner known to him into the information system, his attention is not diverted during the operation while he is driving the motor vehicle. This results in an improvement of traffic safety.

In this case, it is advantageous for a respective application of the component to be personalized with respect to its operation.

In particular, the personalization takes place within the scope of the integration of the component by way of the man-machine interface or a computer that can be connected with the latter.

According to an advantageous further development, the information system has an especially tree-type menu structure which comprises a number of menus selectable by way of the man-machine interface, in which case it is defined by way of the man-machine interface to which of the menus the at least one application executable or provided by the component is assigned for the selection. This permits the use of an existing menu structure of the information system, in which case the user can freely select at which point in the menu structure he wants to carry out the operation of the component or of the application that can be executed or is provided on the latter. Operating sequences can thereby be simplified.

By use of the man-machine interface, all communications and interaction processes between the user of the information system and the vehicle are carried out by way of input and output devices available in the vehicle. The execution of the application is not only the running of the application but especially also its operation, for example, by way of various, possibly nested menus or voice input instructions.

As an alternative, the personalization takes place before the integration of the component by use of the component itself or a computer. Particularly in the case of the last variant, it is possible for the user to not carry out the personalization by way of the operating devices (man-machine interface) available in the vehicle. The user can, for example, carry out the personalization at his computer or laptop and transmit the personalization information to the component to be integrated into the vehicle or to the information system, whereby the integration process into the vehicle will be simplified for the user.

Within the scope of the personalization of the operation, for example, an occupancy of input and/or output devices (for example, a key occupancy of keys or softkeys) of the main-machine interface, of bookmarks and of voice instructions is defined.

It is further advantageous for a respective application of the component to be assigned according to a preset criterion to a predefined menu of the menus of the menu structure. The assignment according to predefined criteria can take place, for example, according to logical aspects. A predefined criterion may, for example, be a category. If an application executed or provided by the component concerns, for example, a service for the navigation or a service connected therewith, according to this variant, the latter is advantageously provided in the menu structure in the "Navigation" domain.

According to a further advantageous development, when integrating the component into the information system, for a respective application, one or more parameters are determined which represent the input and/or output of information of a respective application of the component by way of the information system. By means of the parameters, as a result of the information system, an integration of an application of the component can take place into the menu structure of the man-machine interface. Such parameters may, for example, comprise a main category (for example, navigation, entertainment, telephone, office, air-conditioning, etc.) as well as one or more subcategories that are independent thereof (such as radio, CD, MP3 player; telephone book, last selected calling number; new navigation destination, last stored navigation destinations, etc.). The parameters are therefore used for the technical integration of the input and/or output structures of the components into the information system.

The parameters are advantageously determined during the first-time integration of the component into the information system and are stored in a memory. The storage may, for example, take place in a memory of the information system of the vehicle or in a memory of the component or in another memory, particularly a central databank. In the case of each subsequent connection of the component to the information system, the parameters will be read out of the memory and used for its integration. If the parameters are stored in a memory of the component or in a central memory, they will be available in a plurality of vehicles. The components can therefore be used in a simple manner in a plurality of vehicles, which permit a linking of the component. In this case, the corresponding parameters have to be determined and stored only once. When the component is connected with the information system of the vehicle, the parameters will be transmitted to the information system for further processing.

According to an advantageous further development, at the start of an application of the component connected to the information system, at least one priority value is assigned to the application with respect to the man-machine interface, the priority value indicating a rank by which the application of the component is treated with a higher or lower priority with respect to a further application that is being executed or is to be executed by the information system.

By the assignment of a priority value to the application with respect to the man-machine interface, the application executed or provided by the component can be integrated into a priority management of the man-machine interface of the vehicle. In this manner, it is ensured that important information, such as status messages of the vehicle relating to the operating condition, will not be hidden, masked or, in the case of an acoustic output, interrupted by the application of the component. By use of the priority value, the "importance" of the application in relation to other applications executed by the information system can be defined in a simple manner, whereby the target-oriented function of the information system is not impaired.

According to a further advantageous development, a message is transmitted to the information system at the start of the application of the component, in which message the resources of the man-machine interface required by the application for its execution are described, a respective priority value being assigned to one or more of the required resources of the man-machine interface. Resources are generally all devices for the output of information, particularly of audio or video data, as well as all input devices. Resources are therefore, for example, loudspeakers, displays and the like. In this manner, it is defined which priority value the application has when using a certain resource of the man-machine application with respect to other applications that are being executed or are to be executed by the information system. It can therefore be ensured with a high probability that the application executed or provided by the component will not disadvantageously influence the vehicle's own priority management of the man-machine interface.

According to a further advantageous development, the priority value is dynamically changed as a function of a vehicle parameter. Such vehicle parameters may, for example, be the vehicle speed, in which case, when a predefined speed is exceeded, information on an output device is hidden in order to ensure driving safety. It can hereby also be controlled whether or not a menu for operating the application is still permitted to be displayed as a function of the vehicle parameter.

Advantageously, one or more of the following devices are integrated as a component into the information system of the vehicle: An audio player, particularly a portable CD player, an MP3 player or web (radio) player or video player, particularly a portable DVD player, TV player, or video camera.

A further development provides that, in the case of an application of the component executed by the information system and a not target-oriented separation of the component from the information system, a treatment of the application termination takes place according to which:

the application is indicated as no longer being available, or the application is removed from the information system, or data intermediately stored in the information system continue to be processed beyond the application termination for a predefined time period, or data only partially transmitted to the information system by the application are reloaded or completed, or a prediction of the connection termination takes place.

With this development variant, it is ensured that, in the event of a not target-oriented separation of the component from the information system, neither the application, nor the information system can be damaged with respect to the software running thereon. As a result, the target-oriented function of the information system can be ensured.

According to a further advantageous development, data, such as, images and texts, in particular, used regularly during the start of the application for the output of information by way of the man-machine interface are transmitted into a memory of the information system, in which case the data, if they are needed during the execution of the application, are loaded from the memory of the information system. This can improve the reactivity of the application. Furthermore, the danger of diversion during the drive is reduced. In order to be able to organize the regularly used data provided in the memory of the information system, each piece of data (text component or icon) can be provided with an unambiguous ID by which the respective data can be called and processed. Furthermore, translations may be provided in the memory for texts or text components, which translation will be used in the vehicle depending on the language adjustment.

In a further development of the invention, a partial area of a display surface is made available to the application of the component for the visual output of information by way of a display of the man-machine interface, another partial area remaining under the control of the information system. According to a special variant of the execution, the information intended for the output is generated in the partial area available to the application by the application executed on the component. According to an alternative execution variant, the information intended for the output is generated in the partial area available to the application by the information system under the control of the application. In the former case, only the display of the man-machine interface is used by the application for the output of information, while the computing-intensive steps for the so-called rendering of the images are executed by the component on which the application is running. Therefore, only the display of the man-machine interface is used for the output. In contrast, in the latter case, the generating of the information to be displayed takes place by a computer unit of the information system itself, the data required for the visualization being provided by the application of the component.

A further development provides that the application accesses at least one vehicle-specific parameter by way of a defined programming interface, or the at least one vehicle-specific parameter is provided to the application by way of the defined programming interface, and the application processes the at least one parameter that was made available. In this case, it may particularly be provided that the at least one vehicle-specific parameter represents a current driving situation of the vehicle, a vehicle condition, and/or takes into account a current location of the vehicle. In particular, as a result of the application of the component, the position of the vehicle, its speed, a tank content, a language or a tuned-in radio station can be taken into account and processed. Especially, so-called location-based services can thereby be offered by way of the application.

The invention further comprises a computer program product, which can be loaded directly into the internal memory of a digital computer of a vehicle and includes software code sections by which the steps of the described process can be executed when the product is running on the computer.

The invention further creates an information system in a vehicle, which can be operated by way of a man-machine interface and provides information to a user of the vehicle, in which case at least one application executable or provided by a component can be integrated into the information system. According to the invention, the information system has devices by which the integration of the component into the information system with respect to the input and/or output of information can be carried out in a personalized manner with respect to a user of the component.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
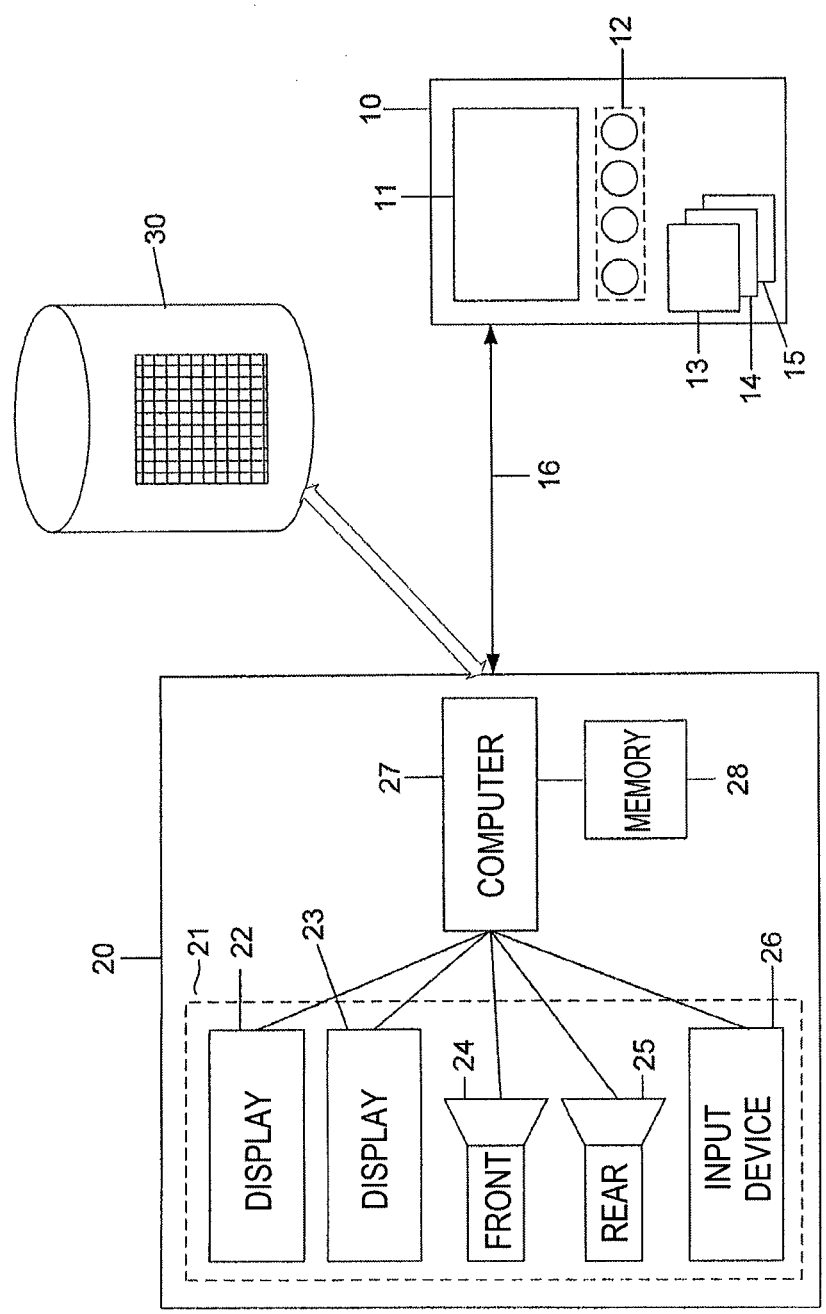
FIG. 1 is a schematic representation of an exemplary information system according to the invention into which a component can be integrated that has at least one application running on it.

The information system 20 in a vehicle includes a man-machine interface 21 as well as a computer 27 for its control. The man-machine interface 21 consists of an input device 26, for example, in the form of one or more keys, a so-called rotary-push controller, a microphone and the like as well as, for example, two displays 22, 23 and two loudspeakers 24, 25. One of the displays 22, 23 represents, for example, a centrally arranged information display; for example, for the representation of navigation data, radio stations and the like, while the other of the two displays is an information display by which information concerning driven miles, range, mileage and the like are visualized for the driver. Loudspeaker 24 represents, for example, the loudspeakers installed in the front, while loudspeaker 25 is representative of the loudspeakers installed in the rear. In addition to the input/output elements illustrated in the figure, the man-machine interface may comprise further elements. The computer 27 is used for controlling the man-machine interface 21 and receives the data entered by the user by way of the input device, processes these data and emits corresponding information by way of one or more output devices 22, 23, 24, 25. All components of the man-machine interface can be connected with one another, for example, by way of the data bus. The computer thereby takes over the function of a man-machine interaction (MMI) manager. A databank 30 is also outlined in FIG. 1, which is managed, for example, by the manufacturer of the vehicle. By way of a wireless communications link, the computer 27 of the information system 20 is capable of exchanging data with the databank 30 and particularly of retrieving data stored therein for further processing.

A component 10, such as an audio and/or video player, is temporarily or permanently connected to the information system 20 by way of a data connection 16. The data connection may be constructed, for example, as a data bus. The component 10 has its own input/output devices by way of which the applications 13, 14, 15 executable by the component 10 and stored thereon can be operated and used. A display 11, for example, is provided as the output device. The input device 12 is represented, for example, by a number of keys. The component 10 typically has its own computer unit as well as corresponding storage devices for the execution of the applications 13, 14, 15 stored on the component 10.

The computer 27 is connected with a memory 28 in which a set of input/output rules is stored which is valid for the information system. A set of input/output rules consists of information concerning the version, the selection possibilities, the expansion possibilities, the manner of operation as well as the available input and output devices and the possible communications and interaction processes for the information system. In this case, the set of input/output rules is dependent on the concrete further development of the man-machine interface 20 and particularly dependent on a special vehicle, its series or vehicle equipment. The process logic available in the computer 27 validates the input/output rules originating from the component 10 or from the input/output devices of the man-machine interface 20. It is thereby ensured that the units controllable by way of the information system meet the set of input/output rules. As a result of the input/output rules, which are specific for a special component and a certain man-machine interface 21 of the information system 20, the use of the application executable or provided by the component 10 becomes possible by means of the man-machine interface 21 of the information system 20.

For each application 13, 14, 15 made available by the component 10, a description of its semantics is made available, on the basis of which a generic interface generator will then produce a suitable user interface and integrate the latter into the man-machine interface 21 of the information system 20. Such an approach is described, for example, in the above-mentioned German Patent document DE 101 34 717 A1. A further description of the approach for the integration and providing of a user interface is described in the publication "HMI Generation for Plug-in Semantic Description" by Andreas Hildisch, Jürgen Steurer and Reinhard Stolle, whose content is expressly incorporated by reference herein.

In the following description, the interaction of the application 13, 14, 15 executed or provided by the component 10 and the man-machine interface of the information system 20 will be described in detail under the aspect that the systematization and execution of the man-machine interface will not at all be impaired by the vehicle-external component subsequently placed in the vehicle and simultaneously will fulfill the user's preferences. The execution of the application is not only the running of the application but particularly also its operation, for example, by way of various, possibly nested, menus or voice input instructions.

In order not to influence the function of the information system 20 by the integration of a vehicle-external component 10 in such a manner that functions, as, for example, warnings, are overridden, suppressed or otherwise negatively influenced, it is provided to integrate the application 13, 14, 15, 20 executable or provided by the component into the priority management of the information system. It is thereby ensured that important information, such as conditions of the vehicle, are not hidden, masked or, in the case of an acoustic output, interrupted by operating elements of the application or by the application itself.

For this purpose, a priority value is assigned to the application with respect to the man-machine interface 21 at the start of an application 13, 14, 15 of the component 10 connected to the information system 20. The priority value indicates a rank by which the application of the component is treated with a higher or lower priority with respect to a further application that is being executed or is to be executed by the information system. The assignment of the priority value takes place, for example, by the computer 27.

The component 10 therefore has to register itself at the information system and announce its priority relative to other components. The information system 20, in turn, has to ensure that the component 10 cannot suppress or interrupt safety-relevant connections. Such safety-relevant connections are, for example, warning sounds. In order to be able to carry out the assignment of a priority value to an application of a component, and to be able to implement the integration into an already existing priority management of a vehicle, it is first necessary to define the resources available in a vehicle (input/output devices, such as displays, loudspeakers and the like) and to simultaneously assign a respective priority value to the resources of the man-machine interface required by an application. This takes place in that, at its start, the application names the resources required by it in inquiry with respect to the information system 20. The application can simultaneously indicate with which priority it would like to claim the resources. By way of the computer 27, an adjustment of the retrieved priority values then takes place in relation to the rules defined within the priority management. The result is an assignment of the priority values of the application to the required resource or resources of the man-machine interface. The respective priority values can be stored in the memory 28 of the information system 20 or of the data bank outside the vehicle. At the next start of the application, the once defined priority values can then be loaded from one of the two mentioned memories.

In this context, it is advantageous for a respective priority value to be assigned to one of several predefined priority classes, which are defined corresponding to an output type of information of the man-machine interface concerning the operation. Typically, popup menus and standard menus exist in a man-machine interface, in which different options are displayed in the manner of a list. Within the priority management, a priority class has a rank by which the output of an information of an application of a given priority class takes place with a higher or lower priority with respect to an output of an information of an additional application with a different given priority class. This means that, for example, a popup menu is granted a higher priority than a standard menu. However, if the application of the components would like to display a popup menu, it has to be ensured that thereby more important information, for example, warnings, are not faded over. This takes place by the above-described assignment of the priority value.

The priority values for the individual resources can be changed at the running time of the application. This can take place, for example, if the context of the application changes. The defining of the priority values can take place, for example, by the comparison of priority values of other components which are already integrated into the information system. The resource access control for an input/output device takes place for every change of a selected selection element, for example, of a menu. As a function of the priority of the just selected component, a new component may come into focus (i.e. be selected by way of the input device) or not.

As a result of the priority management for all resources, i.e. input/output devices, the man-machine interface 21, for example, the following cases can be taken into account:

Display Scenarios

1. Representation of Menus of the Component, the Data Type of the Application to be Executed being Known:

The portable component, for example, a PDA, an MP3 player, a mobile radio telephone, a navigation device, is integrated into the operating concept of the man-machine interface 21 with its own menu structures. These menus contain a tree of different widgets. As a function of certain events of the component, the currently displayed menu of the man-machine interface will change, taking into account respective priority values.

2. Popup Menus of the Component:

Within the scope of the execution of an application, some components provide information which is displayed as a popup menu by the man-machine interface 21. A popup menu is characterized in that it comes to be situated as the uppermost layer over other menus or popup menus. As a function of certain component events, as, for example, a navigation information provided by the component application or an incoming call, a new popup menu can be displayed, this taking place as a function of an assigned priority value.

Audio Scenarios

1. Component as an Audio Source with a Known Data Type:

The component, for example, a PDA or MP3 player, can be connected as an audio source with the information system 20. In the case of a known data type or type of the component, the man-machine interface will know which kind of audio type is made available by the component. As a function of the assigned priority value, the relevance of the application can therefore be determined with respect to further applications of the main-machine interface, and the audio source can be treated as if it were an own audio source of the vehicle.

2. Component as an Audio Source with an Unknown Source Type:

The component may offer a service providing audio data to the information system which the latter does not know. This could, for example, be a web radio received by way of the component. As a result of the unknown data type, the relevance of the data stream cannot be classified. In order to fulfill the demands of the priority management, such an application of a component is awarded a very low priority in comparison to other applications that are executed by the information system. In this manner, the application can be integrated as an audio source into the man-machine interface 21, in which case, however, safety-relevant events will be treated with precedence because of their comparatively higher priority.

Video Scenarios

1. Display of Videos as a Function of a Context:

The videos made available by a component are suppressed as a function of a vehicle parameter, such as the vehicle speed. If a certain set speed value is exceeded, a video stream, that is just being used, will be stopped. The resumption of the video stream can take place as a function of a predefined condition, such as the stoppage of the vehicle.

2. Component as a Video Source with a Known or Unknown Data Type:

The component, for example, a smartphone, a video player, a television receiver or navigation device, can offer various types of video sources (DVD, camera, television, navigation map). These video streams can also be emitted on one of the displays 22, 23 of the man-machine interface 21.

General Scenarios

1. Component with an Unknown Information Type:

Components may provide information of an unknown information type. Irrespective thereof, a priority value is assigned to the application of the component, which priority value defines the prioritized treatment relative to an application executed by the information system.

2. Connection of Several Components to the Information System:

If several components which provide the same information type are connected to the information system, an assignment of a priority value takes place to a respective application made available by the components. A precedence is thereby also established by which it is defined whether one of the applications of the components is executed with a higher or lower priority relative to one another or with respect to further applications of the information system.

3. Certified Component:

In principle, each component connected to the information system could request a high priority with respect to the applications provided by it and could thereby suppress more important information of other applications. In order to be able to carry out the assignment of priority values in a relevant manner, a differentiation is made with respect to known (certified) and unknown components. Known applications of known components are assigned higher priority values than unknown applications or components.

4. User Preferences:

The priority value for an application of a component can be preset by a user. In particular, it is possible in this case to load and use the priority value or values for an application from a memory, for example, the databank 30 illustrated in FIG. 1. A once-assigned priority value should no longer be modifiable in order to prevent that safety-relevant information is disadvantageously impaired by a new assignment.

In order to prevent that arbitrary applications are permitted to emit/indicate an arbitrary content in the man-machine interface, only authorized applications are integrated in the operating structure of the man-machine interface of the information system. For this purpose, different trust levels can be provided and allocated. Furthermore, the access to vehicle data of an application of the component can be connected with certain rights which, in turn, may be bound to a priority value. For example, an application may be permitted to have a reading access to certain data, but a writing access may be prohibited. Furthermore, it may be selectively defined which data are allowed to be processed by the application and which are not. Beyond the assignment of priority values, it can be defined which widgets of an application are prohibited and which are allowed. Widgets are, for example, popup menus, dynamic images, etc. Furthermore, by use of the priority value or values assigned to an application, the number of updates per time unit can be defined by which the application can use the resources of the man-machine interface.

A simple personalization of the application is made possible by the use of priority values which are assigned to an application with respect to a man-machine interface. However, the personalization can also be implemented without the above-described priority management. Personalization means that each user can configure the integration of the application by use of his own profile, possibly with his own assignment of priority values.

It can, for example, be defined into which menu of a, for example, tree-type menu structure of the information system an application is to be integrated. Here, the user can make use of the given menu structure.

An information system typically comprises "navigation", "entertainment", "telephone", "office", "air-conditioning", etc. as main menu items. Each of these main menu items comprises a number of lower-ranking menu entries which, in turn, may have menu entries as a function thereof. In principle, when integrating the component, it is left up to the user to integrate a respective application at a point of the menu structure that seems suitable to him. This can take place irrespective of whether or not a logical interrelationship exists between the respective application and the menu item of the menu structure. However, the integration is preferably carried out such that it appears suitable according to logical aspects because, as a result, the operation will be simplified and traffic safety will be ensured.

For example, a category can be defined for the application, whereby the entry point (i.e. the menu item of the menu structure) is implicitly defined for access to the application. A personalization of the display with respect to widgets, layouts, type size, colors, fading-out of columns in the case of a table, and the like becomes possible. The personalization may also concern the operation: for example, the occupation of keys, so-called functional bookmarks or voice instructions for the new application.

When integrating the component into the information system, one or more parameters are determined for a respective application, which parameters represent the input and/or output of information of a respective application of the component by way of the information system. By way of the parameters, the integration of the application of the component into the menu structure of the man-machine interface can take place by way of the information system. The parameters are used for the technical integration of the input and/or output structures of the component into the information system. The parameter or parameters are managed, for example, in a profile assigned to the application.

A profile established by a user can be stored in a memory of the information system of the component or an external databank in order to be able to retrieve the carried-out adjustments at a later point-in-time. In this context, it is possible to establish such a profile by way of the man-machine interface in the vehicle, by way of the operating elements of the component or by way of an external PC. It is advantageous for the determination and storage of the parameter or parameters to take place during the first-time integration of the component into the information system. In the case of each reconnection of the component with the information system, the parameters will then be used again for the further processing and integration of the component into the information system.

It is advantageous for the parameter or parameters of a profile to be stored in a memory of the component or a central memory, for example, in a databank communicatively connected with the vehicle, because they can then be available to a plurality of vehicles. This results in a considerable increase in comfort for the user.

In the case of an application of the component integrated into the information system, the data connection between the component and the information system may become interrupted for various reasons. For example, a separation takes place when the application is running and there is an incoming call that is handled by the information system. In order to prevent an unforeseen action of the component as well as of the information system, it is provided to indicate that the application is no longer available in the man-machine interface. The application can, for example, be grayed out. As an alternative, the application can be removed from the man-machine interface, so that the concerned menu item can no longer be selected. In order to prevent a loss of data, it is advantageous to continue to process and particularly store data intermediately stored in the information system beyond the application interruption for a predefined time period. If a resumption of the application takes place, data only partially transmitted to the information system can be reloaded or supplemented. Furthermore, it may be provided to predict a connection interruption by a timely warning or prefetching and to emit a corresponding message by way of the man-machine interface.

In order to increase the reactivity of the application executed by the component and thereby minimize the diversion during the drive, frequently needed images and texts can be transmitted initially during the start into the information system and be available in its memory. As a result, a later reloading during the operation can be avoided. For this purpose, each text or image resource is advantageously provided with an unambiguous identification. Texts or text components may be stored in the memory in several translations, in which case the information system will automatically select the correct language, depending on the set global language of the information system.

Figure 2:
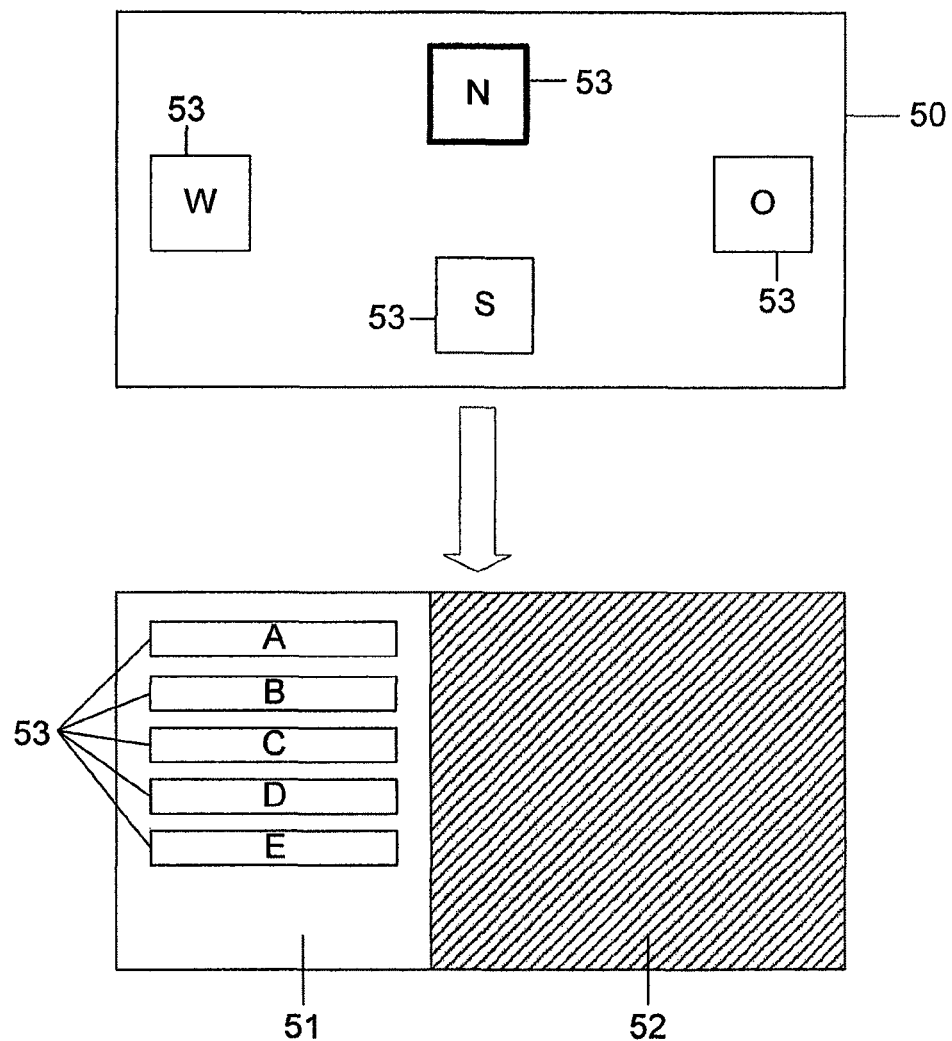
FIG. 2 is a schematic representation of an exemplary menu tree into which the information generated by an external application is integrated.

The prioritization of an application can also be used for making available to the application of the component for the visual output of information by way of a display of the man-machine interface 21 only a partial area of a total display surface, another partial area remaining under the control of the information system. This is illustrated, for example, in FIG. 2. In the upper half, reference number 50 shows a display surface of a display of the man-machine interface 21, a total of four selection elements 53 (so-called softkeys) being illustrated. By way of an input device, one of the selection elements—in FIG. 2, the selection element 53 marked with the bold letter N—can be selected. In this case, the video screen content shown at the bottom of FIG. 2 will appear. In a left partial area marked by reference number 51, a menu can be recognized which has a selection list of entries A to E. By the selection of the entry E, for example, the application executed by the component 10 is called, in which case the right partial area of the application marked by reference number 52 is made available to the application. While the partial area 51 remains under the control of the information system 20, the control of the partial area 52 is carried out by the application. Here, the information to be emitted can be generated by the application executed on the component in the partial area 52 available to the application. For example, the image data required for this purpose are rendered on the component. In an alternative further development, the information to be emitted are generated in the partial area 52 available to the application by the information system 20 under the control of the application. This means that the application makes the data required for generating the image information available to the information system, for example, the computer, which then generates the required information from these data.

As a result, the operation can be improved in many cases. The application can be operated by vehicle-specific elements (illustrated in the left partial area 51) suitable for the driver. Nevertheless, graphic-intensive data, such as map images, can also be displayed. In the description of the application, a freestyle widget can be defined for this purpose. If a change to this state is triggered in the application, a special layer is shown which displays the data rendered by the component. Corresponding examples are an analog video signal or a digital pixel replication. Furthermore, around this layer, vehicle-specific elements, such as a status indicator, may be displayed. In addition, operable elements, such as buttons, can be displayed in a menu beside the layer. The operation can take place by way of the vehicle elements in the toolbar. The representation of the map is rendered by the component and is displayed in the previously defined layer.

A further development provides that the application running on the component can access vehicle data. As a result, by means of GPS data made available by the vehicle, depending on the vehicle position, search services can be carried out by the application, even if the component itself does not have a GPS receiver. For example, the following vehicle data of an application can be made available: vehicle position (for example, for detecting gas stations or restaurants in the environment of the vehicle), vehicle speed, content of tank, time/date, set language, set radio station (for example, with a display of the title and the possibility of an online purchase of a just played title). The vehicle data can be queried once (for example, mileage or vehicle position). As an alternative, data can also be cyclically transferred to the application. The transfer of the data can take place, for example, by an initiative of the application. It can be determined in the inquiry whether an individual value or cyclical data are needed. By way of the priority value assigned to an application, it can be determined which data are permitted to be used by an application. It is thereby ensured that sensitive data cannot be evaluated by unauthorized sites.

In order to ensure that sensitive vehicle data cannot be evaluated by unauthorized applications of a component integrated in the vehicle, it is further provided to transmit the parameter or parameters only to those applications which fulfill a predefined criterion with respect to a right assigned to the application. By way of the right assigned to an application, it can be determined which data are permitted to be used by an application. The assignment of a right to an application or to the user of an application can take place within the scope of a rights management. Within the scope of such a rights management, for example, different safety levels can be provided. The rights allocation may relate to certain applications, groups of applications or all applications integrated or to be integrated in the information system. The rights allocation may also be such that its own rights are allocated for a respective parameter. In this case, rights with respect to the data exchange and/or with respect to the use of the information system can be assigned to a respective application or to the user of an application. These rights may, for example, include reading and/or writing rights with respect to information that is stored in a memory of the information system. The rights may also relate to the authorization to reproduce or the prohibition to reproduce certain widgets. By way of a respective right, the number of updates per time unit can be controlled if a data exchange takes place between the application of the component and the information system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of integrating a hardware component into an information system of a vehicle, the method comprising the acts of:
   making available, via a data connection between the information system and the hardware component, at least one application executable or provided by the hardware component to a user of the vehicle via a man-machine interface of the information system;
   receiving a message by the information system via the data connection from the hardware component, wherein the message describes input/output devices required by the application for its execution;
   assigning, based on the message provided by the hardware component, a respective priority value to one or more of the input/output devices required by the application, wherein the priority value is dynamically changed as a function of a vehicle parameter; and
   integrating the hardware component into the information system with respect to input and/or output of information in a personalized manner with respect to the user of the component.

2. The method according to claim 1, wherein personalization of a respective application of the hardware component occurs with respect to operation of the respective application.

3. The method according to claim 2, wherein for personalizing the operation, the method further comprises the act of optionally defining at least one of: an occupancy of the input and/or output devices, bookmarks, and voice instructions.

4. The method according to claim 2, wherein the respective application of the hardware component is assigned according to a preset criteria to a predefined menu of menus of a menu structure of the information system.

5. The method according to claim 1, wherein personalization takes place within the integrating act by way of the man-machine interface or a computer connectable with the man-machine interface.

6. The method according to claim 5, wherein the information system comprises a tree-type menu structure having a number of menus selectable by way of the man-machine interface, the method further comprising the act of:
   defining, by way of the man-machine interface, to which of the menus the at least one application executable or provided by the component is assigned for selection.

7. The method according to claim 1, wherein personalization occurs before the integration of the hardware component by way of a component or a computer.

8. The method according to claim 1, wherein when integrating the hardware component into the information system, for a respective application, one or more parameters are determined that represent the input and/or output of information of the respective application of the hardware component by way of the information system.

9. The method according to claim 8, wherein the one or more parameters are determined during a first-time integration of the hardware component into the information system, the determined one or more parameters being stored in a memory.

10. The method according to claim 9, wherein, for each subsequent connection of the hardware component to the information system, the stored one or more parameters are read out of the memory and used for the subsequent connection.

11. The method according to claim 1, further comprising the act of:
at a start of an application of the hardware component connected to the information system, assigning at least one priority value to the application with respect to the man-machine interface, the priority value indicating a rank by which the application of the hardware component is treated with a higher or lower priority with respect to a further application being executed or to be executed by the information system.

12. The method according to claim 1, wherein in a case of an application of the hardware component executed by the information system and a not target-oriented separation of the hardware component from the information system, a treatment of the application termination occurs according to which:
the application is displayed as no longer being available,
the application is removed from the information system,
data intermediately stored in the information system continue to be processed beyond the application termination for a predefined time period,
data only partially transmitted to the information system by the application are reloaded or supplemented, or
a prediction of the connection termination takes place.

13. The method according to claim 1, wherein data used regularly during a start of the application for output of information by way of the man-machine interface are transmitted into a memory of the information system, said data being loaded from the memory if needed during execution of the application.

14. The method according to claim 13, wherein said data comprises images and texts.

15. The method according to claim 1, further comprising the acts of:
making available a partial area of a display surface to the application of the hardware component for visually outputting information by way of a display of the man-machine interface; and
maintaining another partial area of the display surface under control of the information system.

16. The method according to claim 15, wherein the information visually output by way of the display in the partial area made available to the application is generated by the application executed on the component.

17. The method according to claim 15, wherein the information visually output by way of the display in the partial area made available to the application is generated by the information system under control by the application.

18. The method according to claim 1, further comprising the acts of:
accessing by way of the application at least one vehicle-specific parameter via a defined programming interface or providing the at least one vehicle-specific parameter to the application via the defined programming interface; and
processing the at least one parameter by the application.

19. The method according to claim 18, wherein the at least one vehicle-specific parameter comprises at least one of:
a current driving situation of the vehicle, a vehicle condition, and a current location of the vehicle.

20. The method of claim 1, wherein the vehicle parameter comprises vehicle speed.

21. A computer program product comprising a non-transitory computer readable medium having stored thereon program code sections that:
makes available, via a data connection between an information system of the vehicle and a hardware component, at least one application executable or provided by the hardware component to a user of a vehicle via a man-machine interface of the information system of the vehicle;
receives a message via the data connection from the hardware component, wherein the message describes input/output devices required by the application for its execution;
assigns, based on the message provided by the hardware component, a respective priority value to one or more of the input/output devices required by the application, wherein the priority value is dynamically changed as a function of a vehicle parameter; and
integrates the hardware component into the information system with respect to input and/or output of information in a personalized manner with respect to the user of the component.

22. The computer program product of claim 21, wherein the vehicle parameter comprises vehicle speed.

23. An information system in a vehicle, comprising:
a hardware component;
a man-machine interface by which the information system is operated, the information system providing information to a user of the vehicle wherein at least one application executable or provided by the hardware component is integratable into the information system;
a non-transitory computer readable medium having stored therein program code segments that:
makes available, via a data connection between the information system and the hardware component, at least one application executable or provided by the hardware component to the user of the vehicle via the man-machine interface of the information system;
receives a message by the information system via the data connection from the hardware component, wherein the message describes input/output devices required by the application for its execution;
assigns, based on the message provided by the hardware component, a respective priority value to one or more of the input/output devices required by the application, wherein the priority value is dynamically changed as a function of a vehicle parameter; and
integrates the component into the information system with respect to input and/or output of information in a personalized manner with respect to the user of the hardware component.

24. The information system of claim 23, wherein the vehicle parameter comprises vehicle speed.

* * * * *